United States Patent
Zeng et al.

(10) Patent No.: US 11,823,581 B2
(45) Date of Patent: Nov. 21, 2023

(54) ROUTING OF HITCHHIKING DRONES WITH RESPECT TO AUTONOMOUS AND CONNECTED VEHICLES

(71) Applicant: Ford Global Technologies, LLC, Dearborn, MI (US)

(72) Inventors: Connie Zeng, Dearborn, MI (US); Jacob Knickerbocker, Dearborn, MI (US); Razia Shaik, Dearborn, MI (US); Kevin Marx, Dearborn, MI (US)

(*) Notice: Subject to any disclaimer, the term of this patent is extended or adjusted under 35 U.S.C. 154(b) by 294 days.

(21) Appl. No.: 16/756,582

(22) PCT Filed: Oct. 16, 2017

(86) PCT No.: PCT/US2017/056802
§ 371 (c)(1),
(2) Date: Apr. 16, 2020

(87) PCT Pub. No.: WO2019/078815
PCT Pub. Date: Apr. 25, 2019

(65) Prior Publication Data
US 2020/0242948 A1    Jul. 30, 2020

(51) Int. Cl.
*G08G 5/00* (2006.01)
*B64C 39/02* (2023.01)
(Continued)

(52) U.S. Cl.
CPC ......... *G08G 5/0034* (2013.01); *B64C 39/024* (2013.01); *G08G 5/006* (2013.01);
(Continued)

(58) Field of Classification Search
CPC .................................................. G08G 5/0034
See application file for complete search history.

(56) References Cited

U.S. PATENT DOCUMENTS 9,387,928 B1 * 7/2016 Gentry .................. B60L 53/00
9,778,653 B1 * 10/2017 McClintock .......... G06Q 10/08
(Continued)

FOREIGN PATENT DOCUMENTS

WO    2017/138922 A1    8/2017

OTHER PUBLICATIONS

International Search Report of the International Searching Authority for PCT/US2017/056802 dated Dec. 28, 2017.

*Primary Examiner* — Jean Paul Cass
(74) *Attorney, Agent, or Firm* — Brandon Hicks; Eversheds Sutherland (US) LLP

(57) ABSTRACT

A drone flight plan between an origin and destination is evaluated with respect to planned routes of connected vehicles. The drone flight path is calculated such that it includes one or more docking segments on one or more vehicles. For multiple vehicles, multiple permutations of docking segments may be evaluated and assigned scores according to risk, drone flying time, timing issues, and other factors. A permutation having a score indicating higher desirability may be selected. The one or more vehicles may be autonomous and routes of the one or more vehicles may be adjusted in order to provide suitable docking segments for the drone flight path. The destination of the drone flight path may also be adjusted in order to permit docking on one or more vehicles.

13 Claims, 12 Drawing Sheets

(51) Int. Cl.
 B64U 80/86 (2023.01)
 B64U 101/60 (2023.01)

(52) U.S. Cl.
 CPC ......... G08G 5/0043 (2013.01); G08G 5/0069 (2013.01); *B64U 80/86* (2023.01); *B64U 2101/60* (2023.01)

(56) References Cited

U.S. PATENT DOCUMENTS

| | | |
|---|---|---|
| 2011/0307280 A1 | 12/2011 | Mandelbaum |
| 2016/0196756 A1 | 7/2016 | Prakash et al. |
| 2016/0200438 A1 | 7/2016 | Bokeno et al. |
| 2017/0011340 A1 | 1/2017 | Gabbai |
| 2017/0076616 A1* | 3/2017 | Kanade ............... G06V 20/17 |
| 2017/0234689 A1 | 8/2017 | Gibson et al. |
| 2017/0267343 A1 | 9/2017 | Chen et al. |
| 2019/0039731 A1 | 2/2019 | Marcath et al. |
| 2019/0204856 A1* | 7/2019 | Weng .................. G05D 1/101 |
| 2020/0233411 A1* | 7/2020 | Ivanov ................ G05D 1/104 |
| 2020/0356114 A1* | 11/2020 | Uçar .................. G08G 5/0034 |

* cited by examiner

ROUTING OF HITCHHIKING DRONES WITH RESPECT TO AUTONOMOUS AND CONNECTED VEHICLES

BACKGROUND

Field of the Invention

This invention relates to operation of delivery drones.

Background of the Invention

Companies are currently investing in the development of drones for delivery purposes. Unfortunately, drones only work well under the right condition. They cannot travel long distances: currently, typical drones travel less than 1.9 miles and flight times under 26 minutes before they need to recharge. Drones with added weight (packages) will have reduced travel distance and flight time, making delivery by drone not a scalable or economically viable choice. Drones are also limited by environmental factors such as wind speed, snow, and altitude.

The system and methods disclosed herein provide an improved approach for implementing drone deliveries.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
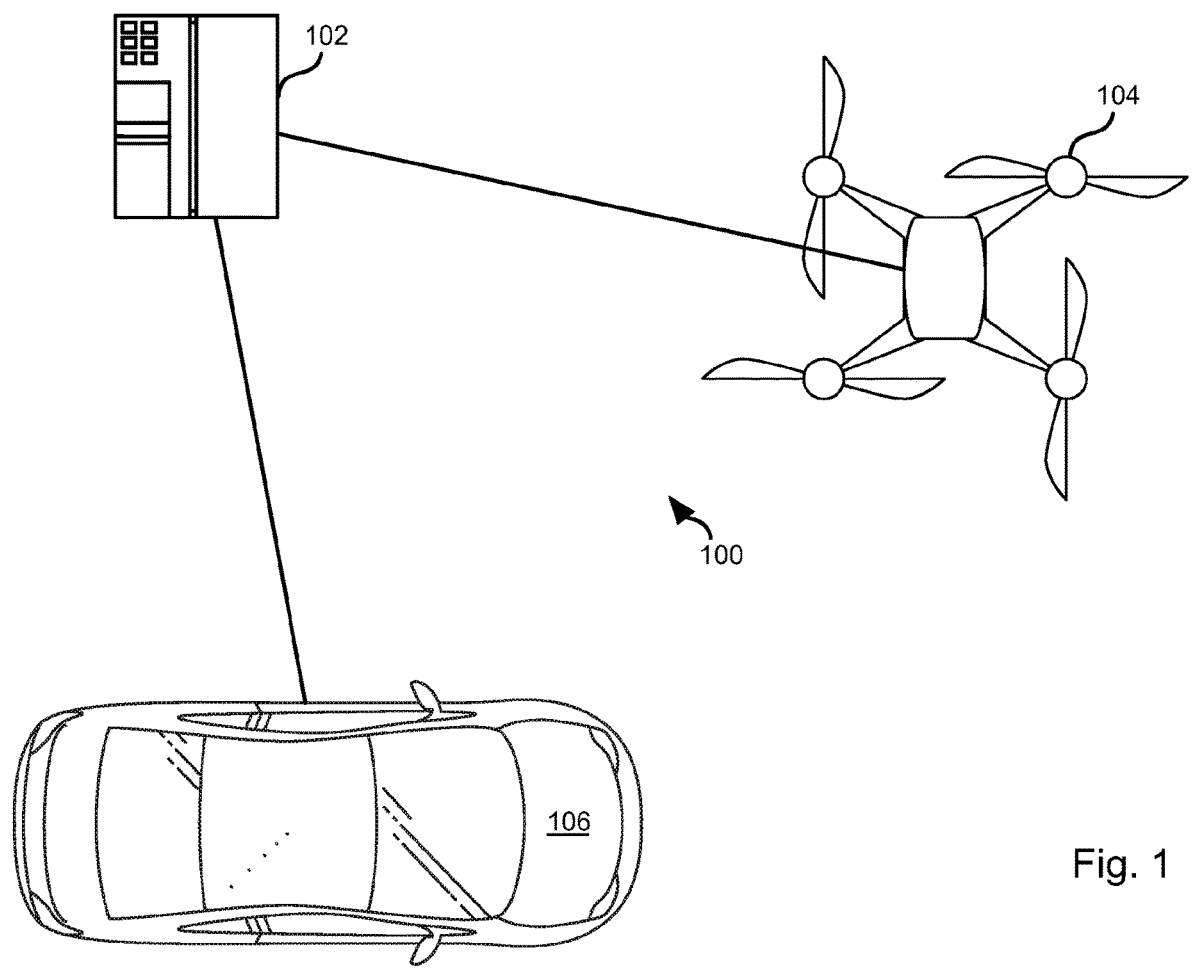
FIG. 1 is a schematic block diagram of a system for implementing embodiments of the invention.

Referring to FIG. 1, a system 100 may include a server system 102 programmed to execute the methods disclosed herein in cooperation with one or more drones 104 and one or more connected vehicles 106. The drones 104 may include any type of drone known in the art and preferably includes the capacity to carry at least a small package. The connected vehicles 106 may be autonomous vehicles or be part of a delivery network such that a planned route of each vehicle 106 as executed by a human driver is known in advance. Where the connected vehicles 106 are autonomous, they may implement any autonomous control algorithm and sensing and control technology known in the art.

Figure 2:
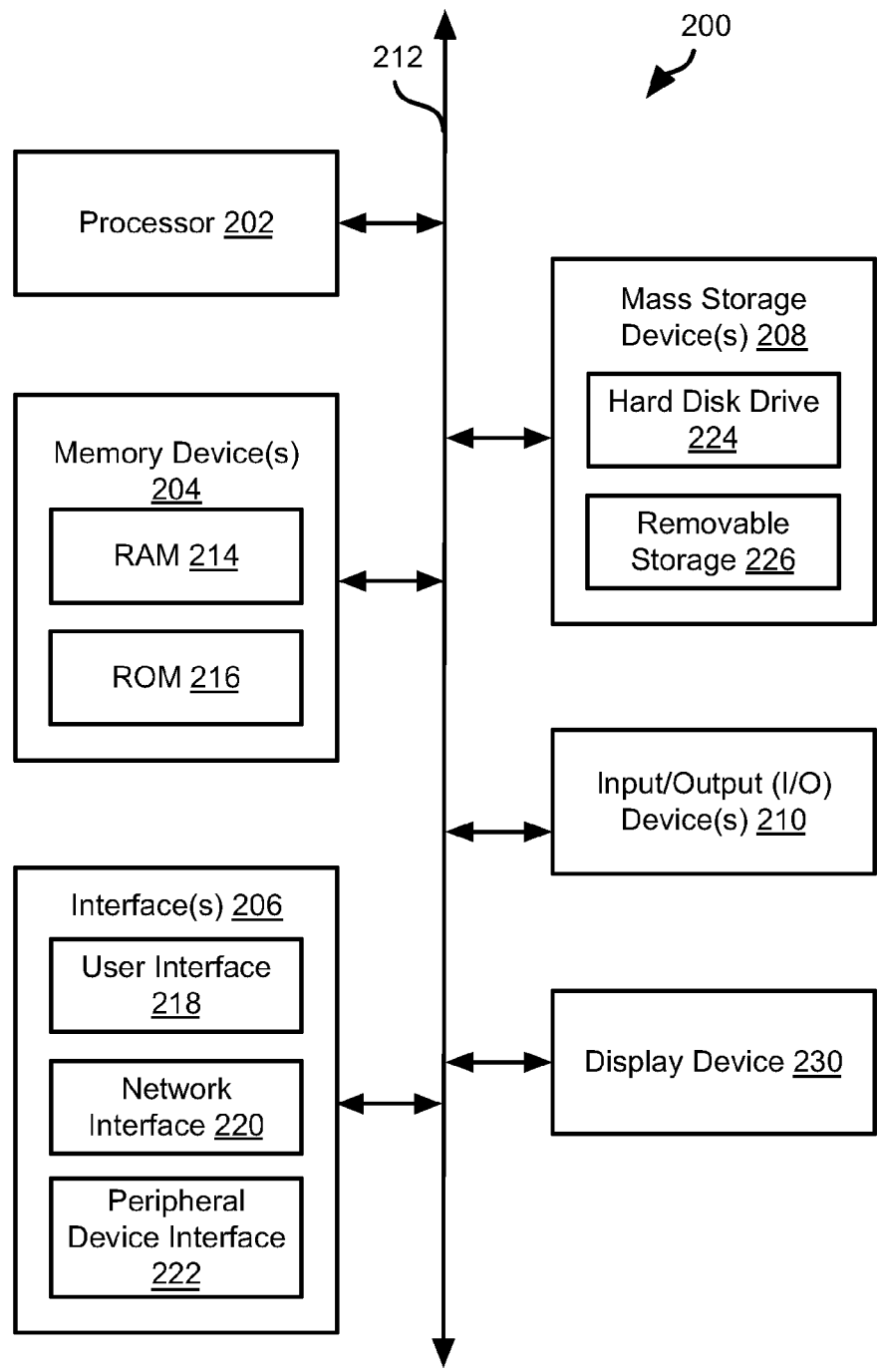
FIG. 2 is a schematic block diagram of an example computing device suitable for implementing methods in accordance with embodiments of the invention.

FIG. 2 is a block diagram illustrating an example computing device 200. Computing device 200 may be used to perform various procedures, such as those discussed herein. The server system 102, drones 104, and connected vehicles 106 may each include one or more computing devices having some or all of the attributes of the computing device 200.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 include any number of different network interfaces 220, such as interfaces to local area networks (LANs), wide area networks (WANs), wireless networks, and the Internet.

Other interface(s) include user interface 218 and peripheral device interface 222. The interface(s) 206 may also include one or more peripheral interfaces such as interfaces for printers, pointing devices (mice, track pad, etc.), keyboards, and the like.

Bus 212 allows processor(s) 202, memory device(s) 204, interface(s) 206, mass storage device(s) 208, I/O device(s) 210, and display device 230 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
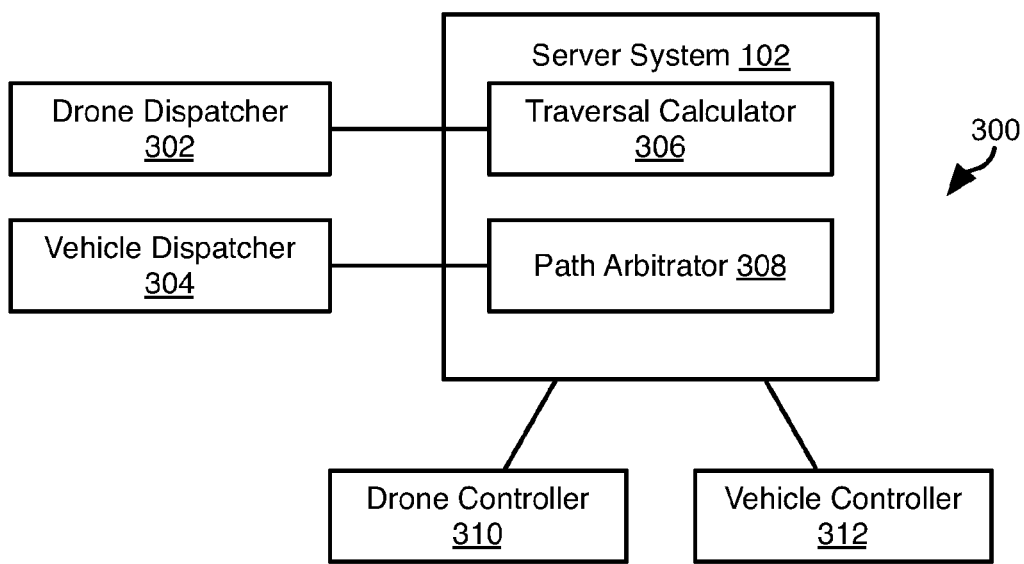
FIG. 3 is schematic block diagram of components for implementing a drone delivery system in accordance with an embodiment of the present invention.

Referring to FIG. 3, the illustrated system 300 may be used to implement the methods described herein. The server system 102 may be in data communication with a drone dispatcher 302 and a vehicle dispatcher 304. These dispatchers may be implemented by the server system 102 itself or by separate computer systems. The drone dispatcher 302 specifies the origins and destinations of drone flight paths for purposes of making deliveries or performing other functions. The vehicle dispatcher 304 likewise determines the origin and destinations of connected vehicles 106 for purposes of transporting passengers, delivering goods, or for no other reason than to provide hitchhiking platforms for the drones 104. The connected vehicles 106 may be autonomous vehicles and therefore the vehicle dispatcher 304 may also perform functions such as routing and providing enhanced map data to the autonomous vehicles to facilitate autonomous navigation.

The server system 102 may receive destinations and origins (origin-destination pairs) for drone flight paths from the drone dispatcher 302 and destinations and origins for connected vehicles 106 from the vehicle dispatcher 304. A traversal calculator 306 calculates a flight path for each origin-destination pair, which may include segments in which the drone executing the flight path docks on a vehicle. Accordingly, the traversal calculator 306 may receive origin-destination pairs for vehicle routes and possibly a planned route for each origin-destination pair. The traversal calculator 306 then identifies possible docking segments for drone flight paths, such as according to the methods described below.

A path arbitrator 308 receives the origin-destination pairs from the vehicle dispatcher and may identify alternative paths for each origin-destination pair. These paths may then be used to identify possible docking segments. The path arbitrator 308 may then select a flight path among the one or more alternatives for each origin-destination pair. Each flight path as determined by the traversal calculator 306 and path arbitrator 308 may then be provided to a drone controller 310 of a drone 104. A route selected by the path arbitrator 308 may be provided to a vehicle controller 312 of an autonomous vehicle or a navigation unit of a human-operated vehicle.

Figure 4:
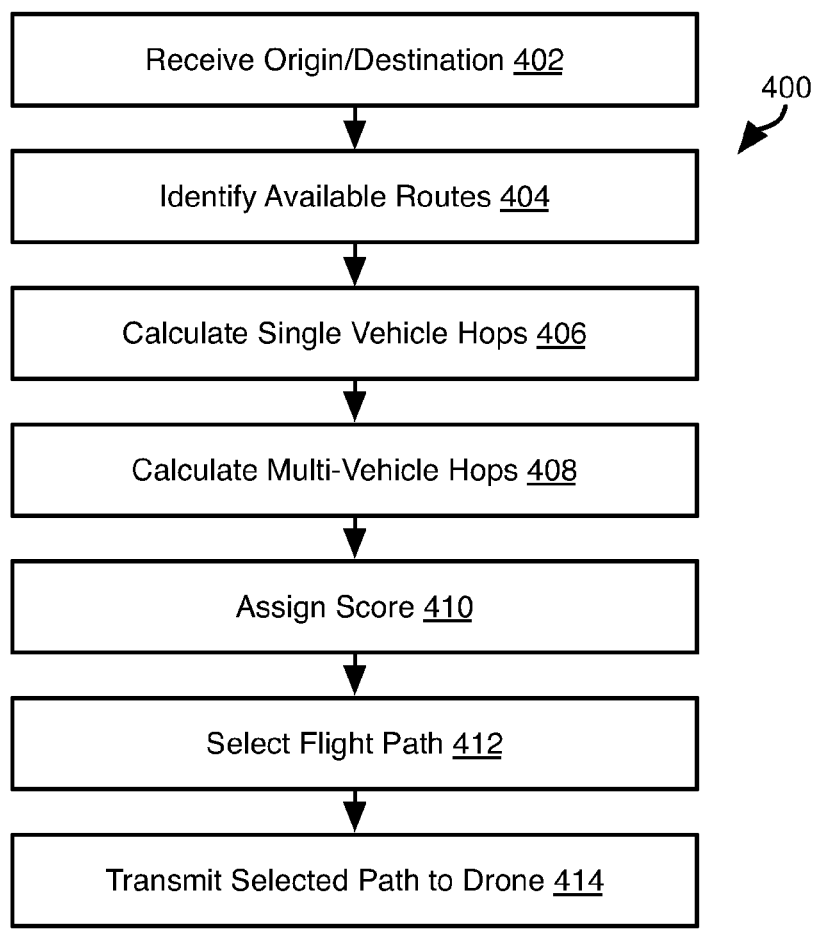
FIG. 4 is process flow diagram of a method for selecting a drone flight path based on planned vehicle routes in accordance with an embodiment of the present invention.

Referring to FIG. 4, the illustrated method 400 may be executed by the server system 102 in order to determine the flight path for a drone 104. The method 400 may assume planned routes for the connected vehicles 106 are known and are not changed as a result of the method 400.

The method 400 may include receiving 402 a request for dispatch of a drone from an origin to a destination. The request may include a start time for departure from the origin or a window in which departure is expected. In this manner, more options for hitchhiking on connected vehicles 106 may be evaluated. The method 400 is preferably executed well before the departure time or window such that the availability of planned routes does not change during execution of the method 400. In other embodiments, execution of the method 400 is performed sufficiently quickly that it can be executed while the planned vehicle routes are currently being executed.

The method 400 may include identifying 404 available vehicle routes. For example, planned vehicle routes that are (a) projected to be at least partially traversed after the departure time or beginning of the departure window and (b) include at least a portion thereof within some geographic threshold from either the origin or destination of step 402. The geographic threshold may be large enough to avoid eliminating candidates but small enough to eliminate routes that are not feasible. For example, the geographic threshold may be the total flight distance of the drone 104 or some multiple thereof, e.g. a value from 2 to 10, or some other value, since the drone 104 may hitchhike and therefore extend its range.

Figure 11:
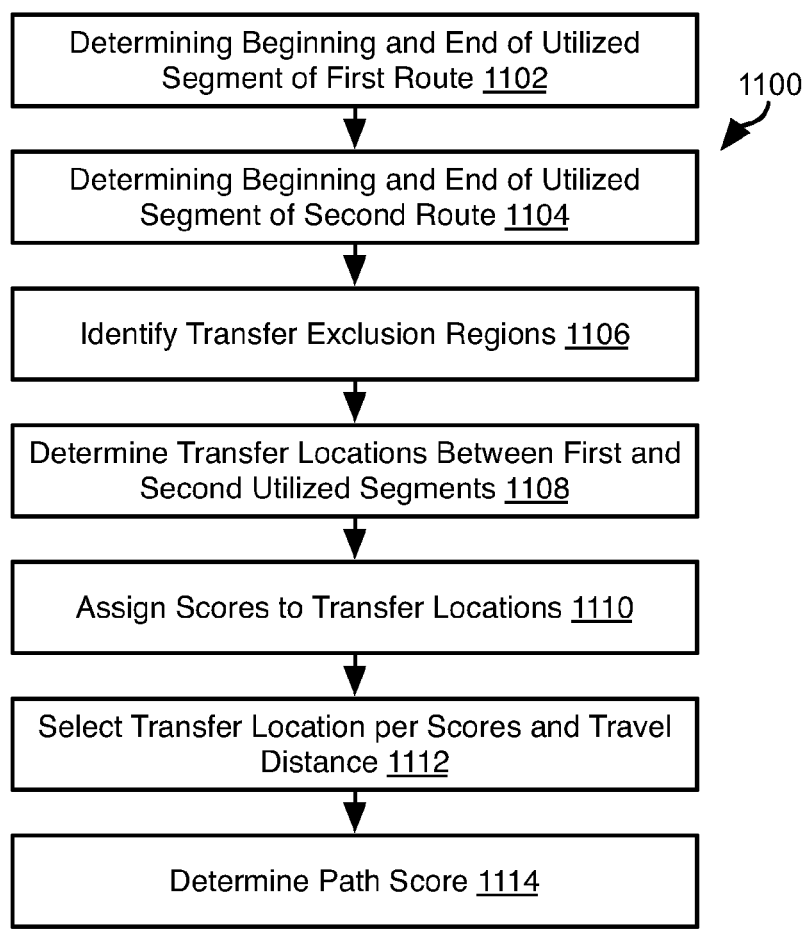
FIG. 11 is a process flow diagram of a method for selecting transfer locations on planned vehicle routes in accordance with an embodiment of the present invention.

The method 400 may include calculating 406 single vehicle hops for the drone flight path. Specifically, for each route identified at step 404, a flight path that only includes docking on the each route and no other route may be calculated at step 406. Specifically, a path from the origin to a beginning ("hop on") of a docking segment, to an end of the docking segment ("hop off"), and to the destination may be calculated at step 406. FIG. 11 illustrates an example method for selecting hop on and hop off points for an individual route. The hop on and hop off locations may have times associated therewith, i.e. the time at which the vehicle is planned to be at the hop on and hop off locations.

The method 400 may include calculating 408 flight paths that include docking segments on multiple routes and therefore include multiple hop on and hop off points and their corresponding times. Step 408 may include evaluating every permutation of two or more routes among the available routes identified at step 404. For example, for routes C1, C2, C3, multi-route permutations may include C1C2, C1C3, C2C3, C1C2C3. Within each permutation, the ordering of the routes may be evaluated based on criteria including drone flight time and arrival time.

A score may then be assigned 410 to each single vehicle and multi-vehicle flight path. In particular, drone flight time and arrival time may be evaluated to assign a score. The relative weights of these factors may be selected based on desired performance. For example, where reduction in drone flight time is critical, then this factor is weighted more heavily than arrival time such that a route that is slower but includes less drone flight time may be preferred. In other embodiments, arrival time may be more critical and therefore weighted more.

In some embodiments assigning 410 a score, may include assigning scores to individual drone flights within the flight path, i.e. flights to docking segments, between docking segments, and from docking segments. The score of a flight path may therefore be a sum of these scores with possible further adjustment according to arrival time. A score for a drone flight may be based on:

One or more Risk Factor(s)—Including for example, the risk factor due to transferring the drone from one car to another safely, the risk of the drone not reaching the car in time, not being secured properly to the vehicle, or falling from the vehicle, etc. The more transfers that have to be made, the higher the risk factor.

The combined time taken for the one or more transfers.

Drone battery consumption and time spent hovering.

One or more external factor(s)—such as weather (e.g., wind speed and direction).

The weight and or size of the drone (with package) relative to the vehicle available.

Availability of a charging station on the vehicle. Where a charging station is available, the score of a flight path may be reduced (made more desirable).

In some embodiments, a score for a path may be biased such that all drones can be transported using available vehicles. For example, steps 402-404, 602-604, and 406-408 may be performed for multiple drones. When scores are assigned at step 410, those flight paths of a drone that overlap one or more flight paths of another drone may be biased against selection. For example, where a lower score indicates higher desirability, a score for a flight path may be increased according to the number of flight paths of other drones that conflict with that flight path, i.e. include overlapping docking segments. The score may increase with both the length over overlap and number of the overlapping docking segments. In this manner, selection of flight paths is biased toward selection of non-conflicting paths such that drones that have no alternatives to conflicting docking segments will be more likely to be allowed to use the conflicting docking segments than those that have alternative non-conflicting flight paths.

The method 400 may then include selecting 412 a path according to the score. In some instances, a lower score means greater desirability. Accordingly, the lowest scoring path may be selected at step 412 and transmitted 414 to the drone for execution. In some embodiments, a feasibility check may be imposed: only paths that include a total flying time less than the total flying time of the drone (as augmented by any projected charging on available charging stations) are available for selection. For the selected flight path, the start time may be selected such that the drone 104 arrives at the first hop on point when the vehicle for the route including the hop on point is at that point.

Once the drone receives the flight path and begins to execute it, the method 400 may continue to be executed based on current locations of vehicles in order to account for traffic or other delays. Accordingly, if the flight path is updated, the updated path may be transmitted to the drone 104, which will then execute the updated flight path.

Figure 5A:
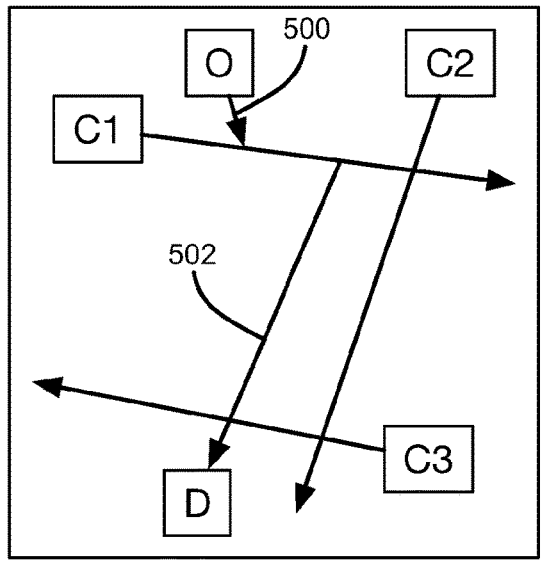
FIGS. 5A through 5D illustrate selection of a drone flight path according to docking segments of planned routes in accordance with an embodiment of the present invention.

FIGS. 5A to 5D illustrate an example execution of the method 400. The drone flight path includes an origin O and a destination D. The planned vehicle routes include C1, C2, and C3. Referring to FIG. 5A, for route C1, a drone flight 500 to the route C1, a docking portion on route C1, and a subsequent drone flight 502 from the route C1 to the destination D are calculated. The drone flights 500, 502 are assigned scores based on length, risk, and possibly other factors. Also, the expected arrival time at 0 is determined for this route.

Figure 5B:
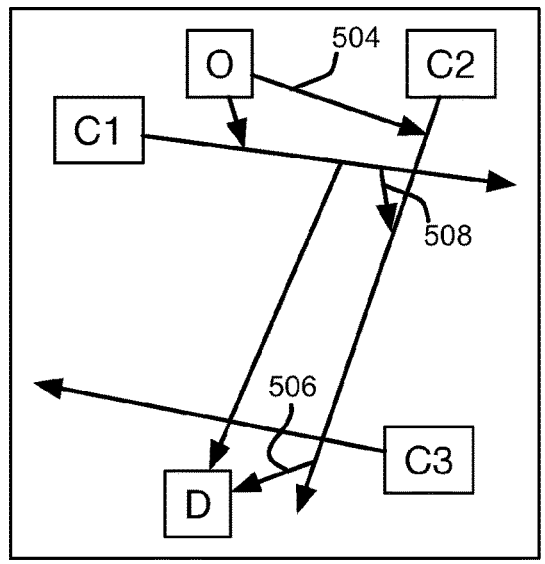

Referring to FIG. 5B, for route C2, a drone flight path is calculated that includes a drone flight 504 from origin O to route C2, a docking segment on route C2, followed by a drone flight from C2 to the destination D.

A multi-vehicle path for C1 and C2 may include the drone flight 500 to C1, a docking segment on C1, a drone flight 508 to C2, a docking segment on C2, and a drone flight 506 to D. Note that the hop on location of drone flight 500 may be the same as for the single-vehicle flight path including C1. Likewise, the hop off point for drone flight 506 may be the same as for the single-vehicle flight path including C2. In some embodiments, this constraint is imposed on each multi-vehicle flight path: the hop on location for the first docking segment is the same as the single-vehicle flight path of the route including the first docking segment; the hop off location for the last docking segment is the same as the hop off location of the single-vehicle flight path for the route including the last docking segment.

Figure 5C:
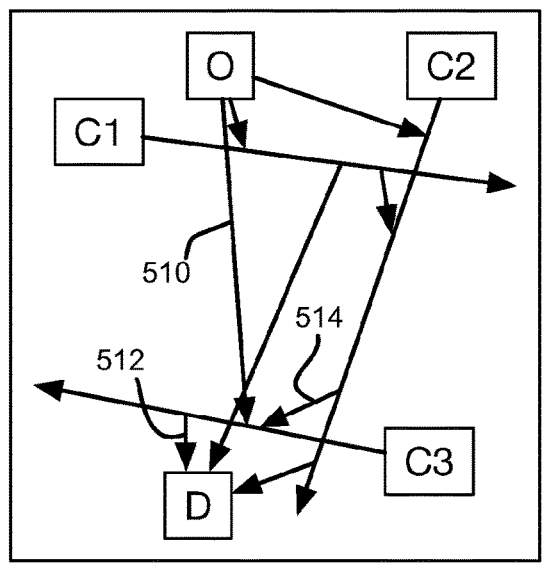

Referring to FIG. 5C, the single-vehicle flight path for route C3 may include a drone flight 510, a docking segment on route C3, and a drone flight 512 to D. An example multi-vehicle flight path may include drone flight 500 to C1, a docking segment on C1, the drone flight 508 to C2, a docking segment on C2, a drone flight 514 to C3, a docking segment on C3, and the drone flight 512 to D. This is only one example and other permutations are possible. In particular, C2C3 may be evaluated which includes the drone flight 504 to C2, a docking segment on C2, the drone flight 514 to C3, a docking segment on C3, and the drone flight 512 to D. In some embodiments, the hop and hop off locations for hops between two routes may be constrained to be the same for each permutation including hops between those two routes. In other embodiments, this constraint is not imposed.

Figure 5D:
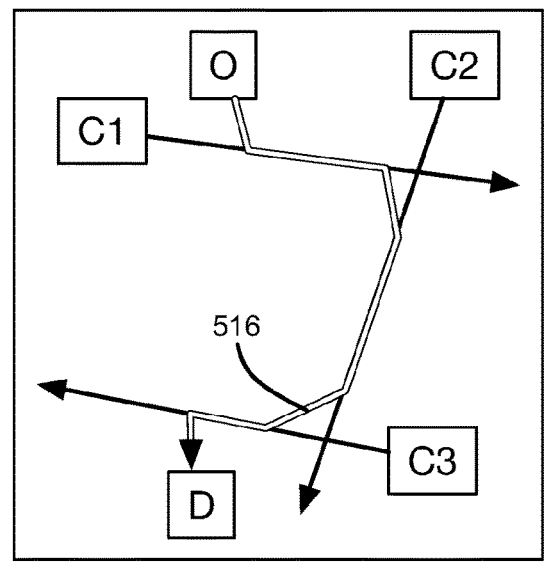

FIG. 5D illustrates an example flight path 516 between O and D that includes docking segments on routes C1, C2, and C3 and drone flights 500, 508, 514, and 512. As noted above, each drone flight may be assigned as score based on duration and possibly risk. Accordingly, the selected flight path may be the flight path such that the sum of the scores of the drone flights in that flight path is less than for other possible flight paths. In the illustrated example, the score for the flight path of FIG. 5D may be function of the sum of scores for drone flights 500, 508, 514, and 512. As noted above, an arrival time may also be a factor in assigning a score to a flight path.

Figure 6:
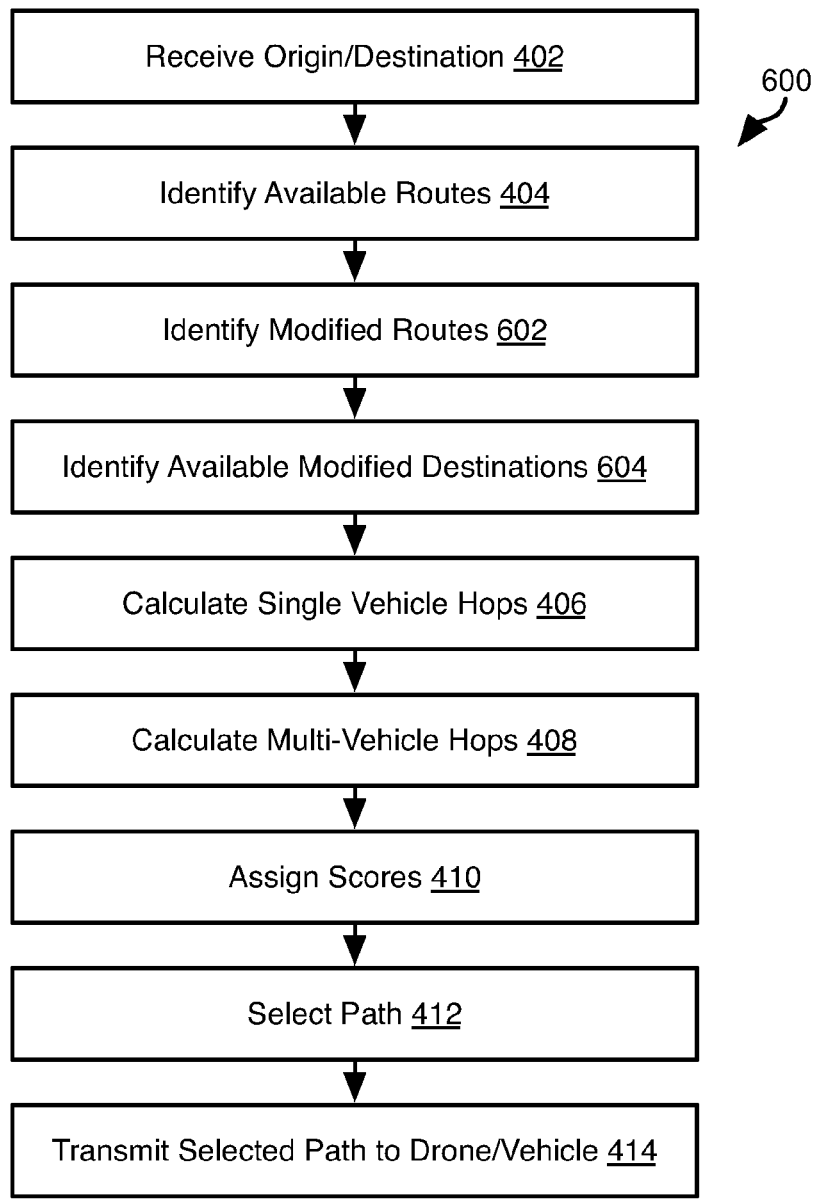
FIG. 6 is a process flow diagram of a method for selecting paths for both a drone and autonomous vehicles in order to accomplish a delivery in accordance with an embodiment of the present invention.

Referring to FIG. 6, the illustrated method 600 may be executed by the server system 102 as an alternative approach for determining drone flight paths. The method 600 may include receiving 402 and origin and destination and identifying 404 available routes in the same manner as for the method 400.

The method 600 may additionally include identifying modified routes 602. In particular, for the vehicle origin and vehicle destination of a planned vehicle route, there may be two or more possible routes to reach that destination that are also feasible. The manner in which these routes are identified may include any navigation approach known in the art of providing navigation data (e.g., turn-by-turn directions) to autonomous or human-operated vehicles.

The method 600 may further include identifying available modified destinations 604 for the drone flight path. In some embodiments, an entity requesting drone delivery may specify a region in which delivery can occur, such as within some radius from a preferred location. Accordingly, one or more destinations 604 that are close to routes from steps 404, 602 may be identified. For example, for each route, a shortest path from that route to a point within the region may be calculated. These points within the region may be selected as possible modified destinations.

The remainder of the method 400 may be executed including calculating 406 single vehicle hops, calculating 408 multi-vehicle hops, assigning 410 scores, selecting 412 a path, and transmitting 414 the selected path to the drone.

However, in the method 600 the paths evaluated include all of the paths from both step 404 and step 602. Likewise, steps 406-410 may be performed for each alternative destination identified at step 604. Accordingly, the number of possible flight paths evaluated is much greater for the method 600 and provides greater flexibility in finding a more ideal flight path.

Figure 7A:
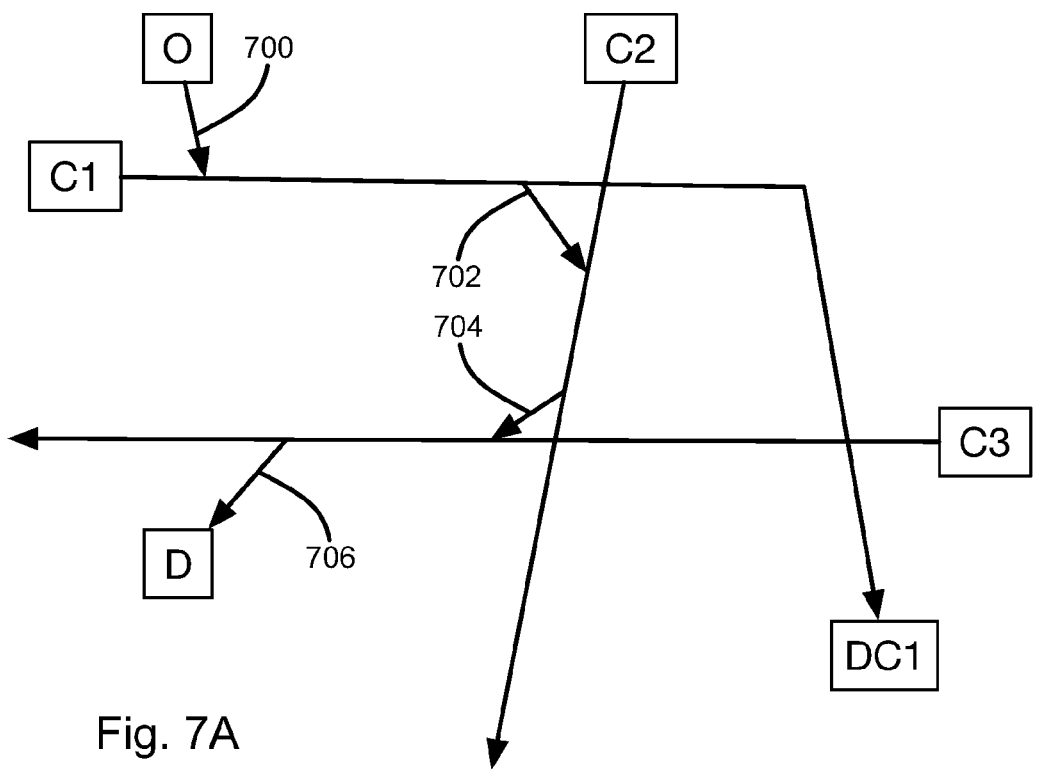
FIGS. 7A to 7C are images illustrating augmenting selection of drone and autonomous vehicle routes in accordance with an embodiment of the present invention.
Figure 7B:
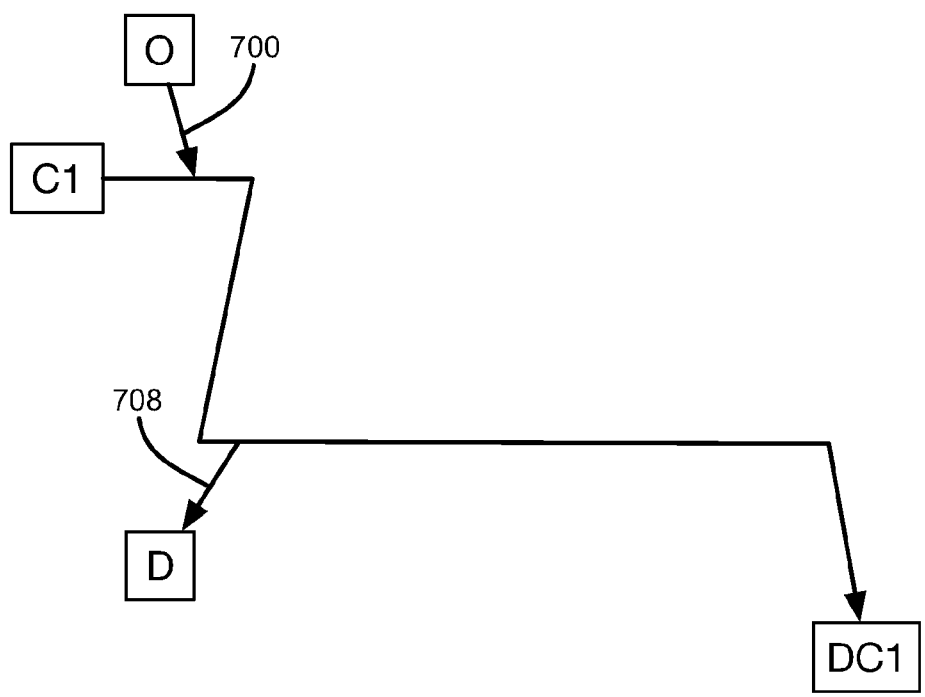
Figure 7C:
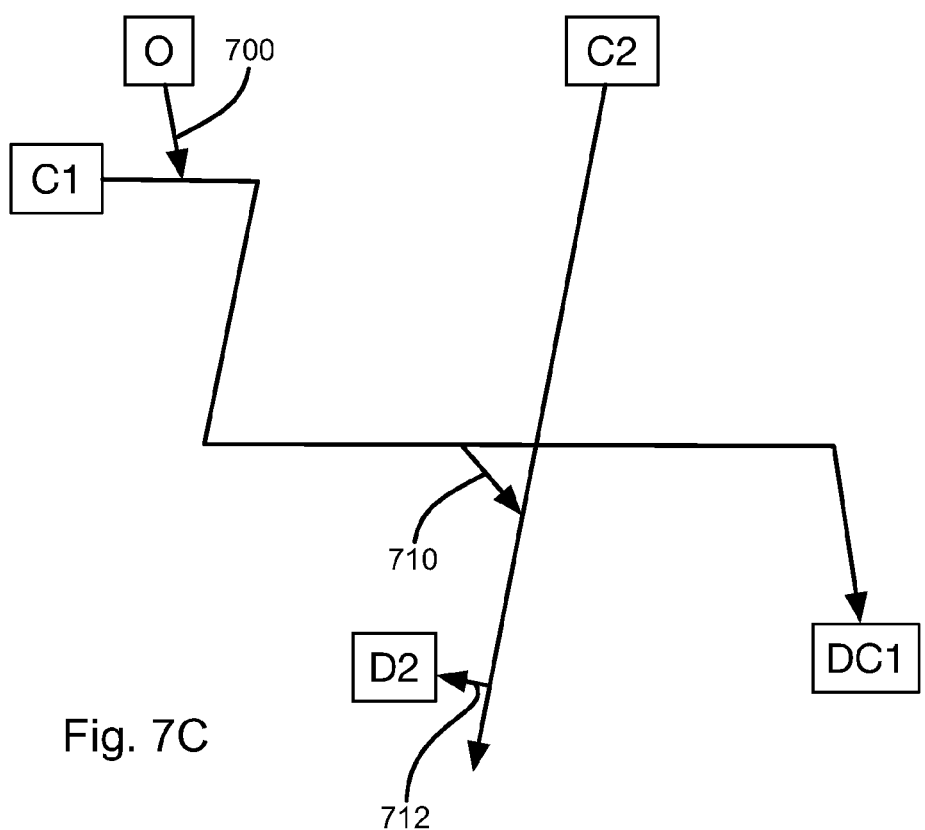

FIGS. 7A to 7C illustrate an example implementation of the method 600. Referring specifically to FIG. 7A, an origin O and preferred destination D may be specified. And vehicle routes C1 and C3 identified. Route C1 includes a destination C1. A flight path may include a drone flight 700 to route C1, a docking segment on C1, a drone flight 702 to route C2, a docking segment on route C2, a drone flight 704 to C3, a docking segment on C3, and a drone flight 706 to D.

FIG. 7B illustrates a modified route to destination DC1 that includes the drone flight 700, a docking segment on modified C1, and a drone flight 708 to D. Note that this only includes one hop on and one hop off and therefore has reduced drone flying time and fewer hops.

FIG. 7C illustrates another alternative flight path including the drone flight 700 to modified C1, a docking segment on modified C1, a drone flight 710 to C2, a docking segment on C2, and a drone flight 712 to a modified destination D2.

Of course, FIGS. 7A to 7C are just a few examples of permutations and modifications that may be evaluated according to the method 600. Each flight path may be scored and a lowest scoring flight path selected for transmitting 414 to the drone. Where a modified route of a vehicle is changed, this modified route may be transmitted 414 to that vehicle as well.

As for the method 400, the method 600 may be repeated after the flight path and routes are transmitted 414 and the flight path or routes of one or more vehicles may be modified according to subsequent iterations of the method 600 to account for delays due to traffic or other causes.

Figure 8:
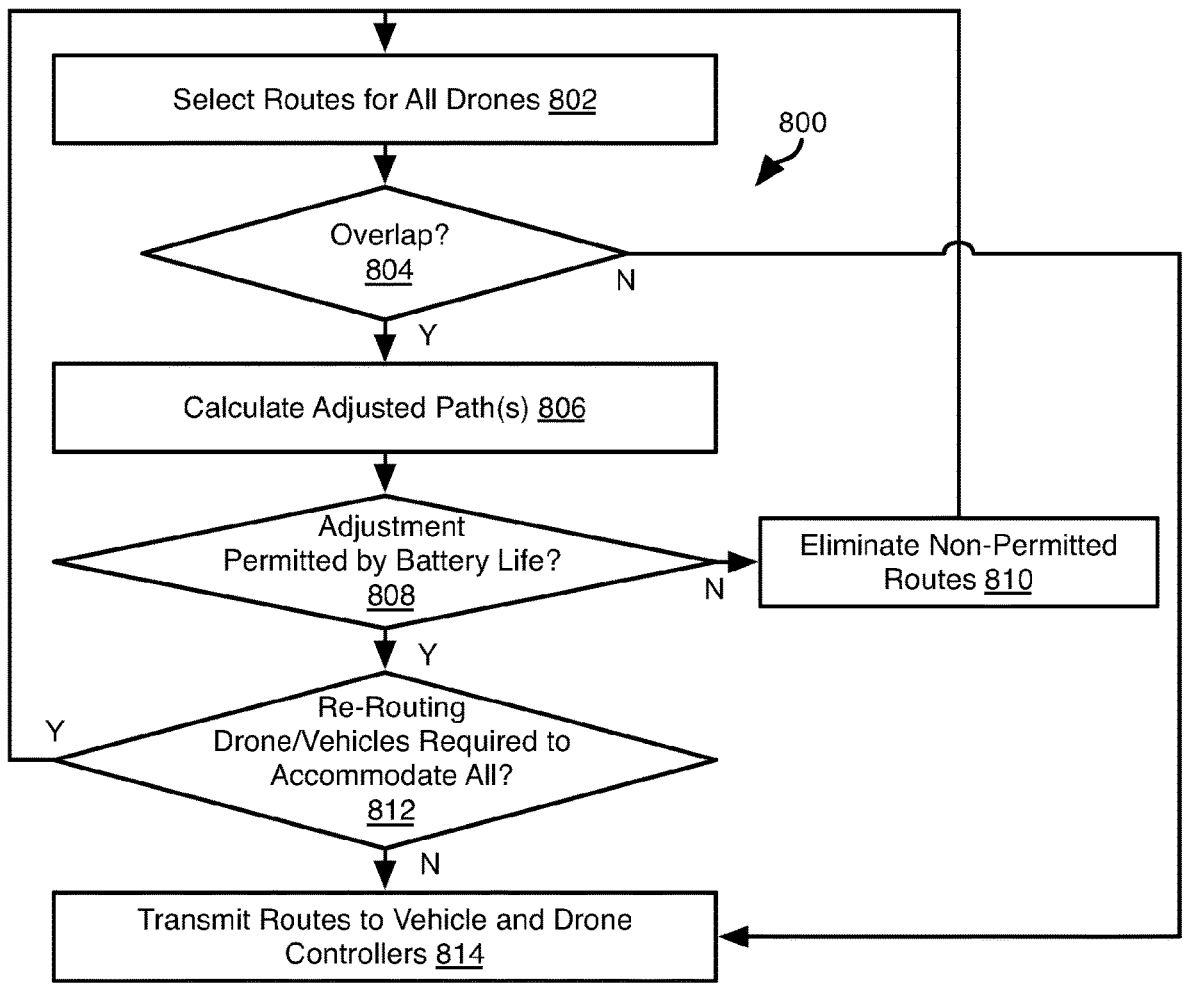
FIG. 8 is a process flow diagram of a method for coordinating route selection among multiple drones in accordance with an embodiment of the present invention.

Referring to FIG. 8, the illustrated method 800 may be executed by the server system 102 where flight paths for multiple drones 104 are planned simultaneously. Note that the method 800 may be omitted in some instances. In such instances, a first request for a drone flight path will be processed and a flight path determined. Subsequent requests will then be processed based on available docking segments, i.e., excluding docking segments of routes already assigned to a flight path of a previous request.

The method 800 may include selecting 802 routes for each drone of the multiple drones. Step 802 may include executing the method 400, 600, and/or the methods 900-1100 described below. The selection of step 802 may be performed for each drone individually without accounting for other drones. Alternatively, execution of step 802 may be biased against conflicting flight paths as described above with respect to the method 600 of FIG. 6.

The method 800 may include evaluating 804 whether there is any overlap between the flight paths selected at step 802. In particular, whether any docking segments overlap one another, i.e. require more drones to be on the same vehicle at the same time than there are available docking stations on that vehicle.

If so, the method 800 may include calculating 806 adjusted flight paths. For example, the hop on and hop off points for two flight paths having overlapping docking segments may be adjusted such that they are no longer overlapping. There may be multiple possible non-overlapping alternatives. Accordingly, step 806 may return multiple alternatives for each pair of overlapping flight paths.

The method 800 may then include evaluating 808 whether any of the alternative flight paths are not permitted, such as by requiring at total drone flying time that is in excess of the battery capability of the drone. If so, then the non-permitted routes are eliminated 810. The method 800 may then repeat at step 802. However, when the selection step of 802 is repeated, constraints or biasing away from the conflicting docking segments may be imposed. For example, where first and second flight paths include an overlapping docking segment and a first flight path includes no alternatives to the overlapping docking segment, the selection of the second flight (i.e., the flight path for an origin-destination pair) may be constrained not to include the overlapping portion of the overlapping docking segments.

The method 800 may then continue with repeated execution of steps 804-808. If the adjusted paths are found 808 to be permissible, then the method 800 may include evaluating 812 whether re-routing of one or more drones 104 or connected vehicles is still necessary to accommodate all drones 104. For example, if conflicting docking segments remain after step 808 due to absence of alternatives feasible or non-feasible.

If so, then step 802 is repeated with constraints, i.e. selection of overlapping portions of docking segments is forbidden or biased against for one or more flight paths including the overlapping portions.

If not, then the flight paths as selected at step 802 and possibly adjusted at step 806 are then transmitted 814 to the drones. Where a route of a connected vehicle 106 was selected or adjusted (see the method 600 described above), this route may be transmitted 814 to that connected vehicle. If no overlap is found at step 804, the flight paths selected at step 802 for the last iteration of step 802 are likewise transmitted 814 to the drones and any adjusted routes are transmitted to the connected vehicles 106.

Note that as for the methods 400 and 600, the method 800 may be executed repeatedly to account for changes and delays due to traffic. Accordingly, updated paths may be transmitted 814 if a subsequent iteration of the method 800 results in a new flight path for a drone or new route for a connected vehicle 106.

Figure 9:
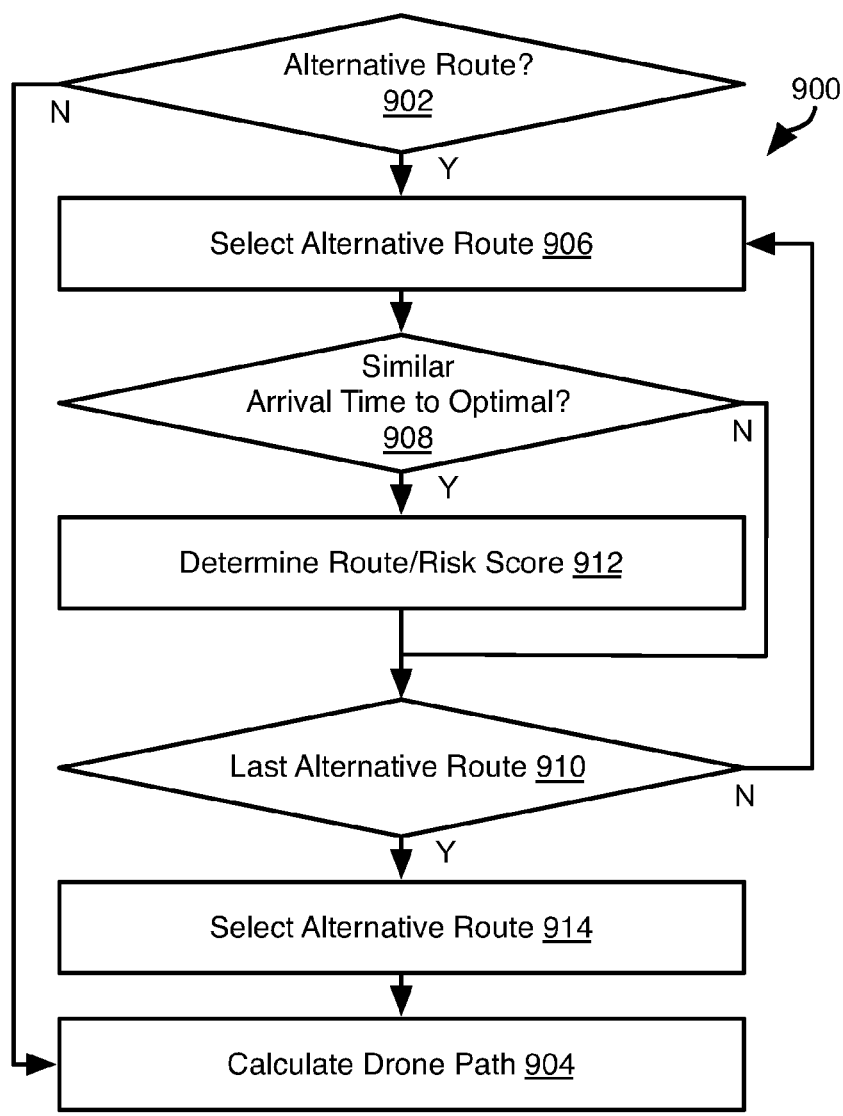
FIG. 9 is a process flow diagram of a method for selecting among alternative routes in accordance with an embodiment of the present invention.

Referring to FIG. 9, the illustrated method 900 may be executed to select among alternative routes for an original route for a connected vehicle 106. Accordingly, the method 900 may be executed as part of the method 600 to identify 602 available modified routes.

The method 900 may include evaluating 902 whether there are any alternative routes for the original route. If not, the method 900 ends and one or more drone paths are calculated 904 based only on availability of the original route, such as according to some or all of the methods 400, 600, 800, 1000, or 1100.

If one or more alternative routes are determined 902 to be available, the method 900 includes selecting 906 one of them for processing as the current route. The method 900 may then include evaluating 908 whether the current route has a similar arrival time to the original route. For example, a threshold may be calculated that is a function of the duration (expected time to traverse) of the original route, i.e. the threshold increases with increase in the duration. If the difference between the duration of the current route and the original route exceeds the threshold, then the routes may be determined 908 not to be similar. The current route may therefore be removed from further consideration. The method 900 may include evaluating 910 whether any more alternative routes remain to be processed. If so the method continues at step 906 with selection of another alternative route as the current route and evaluating 908 the new current route.

If the current route is determined 908 to be similar, the method 900 may include evaluating 912 one or both of a route score and a risk score. The route score may evaluate such factors as length, fuel consumption, traffic, and the like to determine the adequacy of the current route. A risk score may evaluate one or more risk factors that may be drone-specific, such as availability of "transfer regions" where a drone may hop on or off the vehicle, the likelihood of strong winds that would knock a drone of the vehicle or interfere with transfers, or any other risk factor identified by an operator.

The method 900 may then continue at step 910. If other alternative routes remain to be evaluated, processing continues at step 906. If not, then the method 900 may include selecting 914 one or more alternative routes. For example, those routes with route and risk scores meeting one or more threshold conditions may be selected as possible alternative routes for selection according to the method 400, 600, or 800. In particular, a route with first route and risk scores, may be selected at step 914 while a route that has second route score that is higher (e.g., the route is longer) and/or has a second risk score that is higher may be eliminated at step 914.

Figure 10:
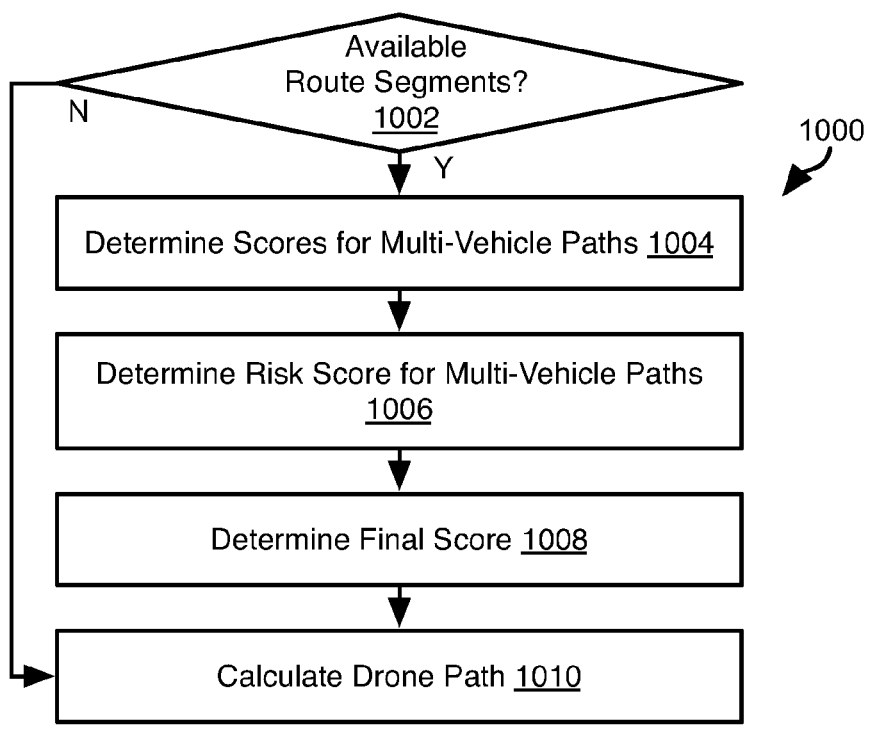
FIG. 10 is a process flow diagram of a method for selecting among possible routes for a drone in accordance with an embodiment of the present invention.

Referring to FIG. 10, the illustrated method 1000 may be executed by the server system to identify a flight path of a drone with respect to one or more planned vehicle routes. The method 1000 may be executed as part of the methods 400, 600, or 800 to identify and assign a score to a single- or multi-vehicle flight path.

The method 1000 may be performed for each origin-destination pair for a drone dispatch and for each permutation of single and multi-vehicle flight paths. In particular, for each permutation of vehicle routes identified as feasible for implementing a flight path for the origin-destination pair as described above with respect to step 404 of the method 400.

The method 1000 may include evaluating 1002 whether a flight path is feasible that includes any segment of any of the identified vehicle routes. In particular, this may include evaluating whether any point on any of the identified vehicle routes is within a maximum range of the drone from the origin and whether any point on any of the identified vehicle routes is within a maximum range of the drone from the destination.

If so, the method 1000 may include determining 1004 drone path scores for a plurality of, possibly all, possible flight path including all or part of segments identified at step 1002. This may include the approach described above with respect to step 410. In particular, a series of two or more hops onto docking segments of two or more routes and hops off of docking segments between the origin and destination may be identified such that the cumulative duration of drone flights between docking segments and hovering time does not exceed the flight time of the drone and results in arrival of the drone at the destination. The locations of hops on and off ("transfers") may be determined according to the method 1100 of FIG. 11. In particular, the method 1100 may be used to determine the utility and risk of individual docking segments of individual routes. In particular, a route may be identified and docking segments of that route may be identified and scored according to the method 1100. A drone path score for the flight path may be calculated as a sum of these scores. The drone path score may also be a function of scores assigned to drone flights between docking segments (see step 410 of the method 400).

The method 1000 may include determining 1008 risk scores for a plurality of, possibly all possible flight path including all or part of segments identified at step 1002. As noted above, the risk for a flight path may include factors along the flight path such as high winds, high vehicle speeds, high drone traffic, or other factors that increase risk of accident or loss along the flight path.

For each flight path assigned a drone path score and risk score at steps 1004 and 1006 a final score may be calculated 1008. The final score may be a combination of the drone path score, the risk score, and possibly other factors such as timing issues. Timing issues may include a duration of the flight path, how much drone flight time is required, how precise arrival and departure times must be. For example, where time for a hop off one route and the time for a subsequent hop on to another route will separated by a time gap. If this time gap will need to be greater than the flight time between the hop off and hop on points. Accordingly, a score may be decreased (lower indicating more desirable) where the time gap is long enough to provide a buffer for arrival but does not require hovering while waiting. For example, the score may be decreased with closeness to an ideal value that is (100+X) percent of the expected flight time, where X is a predetermined buffer percentage.

The method 1000 may further include calculating 1010 a drone path. For example, step 1010 may include defining GPS (global positioning system) way points, flight speeds, and other flight parameters for a drone to execute the flight path. Note that step 1010 may be performed for all paths or only a path selected according to the methods described herein, such as a path having a lowest score (lower being more desirable) or a path selected according to a multi-drone coordination method 800.

FIG. 11 illustrates a method 1100 for selecting hop on and hop off points for a docking segment of a vehicle route, such as a route determined according to the method 900 or any other navigation method known in the art. In particular, the method 1100 is executed with respect to first and second routes to determine transfer points between the first and second routes.

The method 1100 may include determining 1102 beginning and end points of a first utilized segment of the first route. This may include determining a portion of the first route that could feasibly be used as a docking segment. A beginning may be a point closest to the beginning of the first route this is within a maximum distance from either the origin of the flight path or a previous docking segment in the flight path. The end point may be a point closest to the end of the first route that is within the maximum distance from a point on the second path. The maximum distance may be a predetermined value, such as a percentage of the range of the drone based on its known capacity or an estimate of remaining battery life after traversing previous drone flights in the flight path being evaluated according to the method 1100.

Determining 1104 the beginning and end of a second utilized segment of the second route may be performed in a similar manner: the beginning of the utilized segment may be a point closest to the beginning of the second route that is within the maximum distance from the first route. The end may be the point closest to the end of the second route that is within the maximum distance to a third route in the permutation of routes being evaluated or the destination.

The method 1100 may further include identifying 1106 transfer exclusion regions on the first and second utilized segments. These may include portions of the routes where docking or un-docking of the drone to the vehicle is not permitted due to high vehicle speed, overhanging structures (tunnels, signage, etc.), high winds, or other factors specified by an operator.

The method 1100 may further include determining 1108 transfer locations between the first and second utilized segments. This may include identifying segments of the utilized segments that are not excluded according to step 1106. For example, points may be distributed along the first and second utilized segments at a fixed interval (e.g., every 20, 50, 100 feet, or some other interval), excluding portions identified at step 1106. Each point may be determined 1108 to be a potential transfer location.

The method 1100 may further include assigning 1110 scores to each transfer location. Transfer locations on the first and second utilized segments may be assigned scores individually or as pairs, i.e. each combination of a transfer location on the first utilized segment and a transfer location on the second utilized segment. The scores may be assigned based on various factors such as amount of hovering time, expected vehicle speed at the time of docking or undocking, expected winds, and any other parameter specified by the operator. The score may also indicate a benefit in reduced drone flying time. For example, a score for a transfer location pair may increase with factors indicating risk and decrease with drone flying time for that pair. The score may also include a feasibility component, i.e. increase with closeness of the time gap between the transfer locations of the pair to the duration of the expected flight time between the transfer locations. For example, the closer the time gap is to (100+X) of the duration of the expected flight time, the lower the score (lower indicating higher desirability).

The method 1100 may then include selecting 1112 a pair of transfer locations, one on the first utilized segment and one on the second utilized segment according to the score. For example, the lowest scoring transfer location pair may be selected 1112. Using these transfer locations, the score for a path including these transfer locations may be determined 1114, such as according to any of the methods disclosed herein, such as the methods 400, 600, 800, and 1000. In particular, scores assigned to transfers between transfer locations may be combined with scores assigned to drone flights between transfer locations to determine the score for a drone flight path according to step 410 or steps 1004-1008.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s). At least some embodiments of the disclosure have been directed to computer program products comprising such logic (e.g., in the form of software) stored on any computer useable medium. Such software, when executed in one or more data processing devices, causes a device to operate as described herein.

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents. The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A method comprising, by a server system:
accessing a plurality of planned vehicle routes for a plurality of autonomous vehicles;
accessing a drone origin and a drone destination of a drone;
for each permutation of at least a portion of a plurality of permutations of the plurality of planned vehicle routes including one or more routes of the plurality of planned vehicle routes, determining a permutation score for the each permutation, wherein the permutation scores are further based on one or more risk factors, and wherein the permutation scores are further based on minimizes a flight time of the drone,
wherein the risk factors comprise at least one of a first risk associated with transferring the drone among the plurality of autonomous vehicles, a second risk associated with the drone not reaching a vehicle of the plurality of autonomous vehicles in time, and a third risk associated with the drone not being secured properly to the vehicle, and
wherein the first risk is associated with a first weight, the second risk is associated with a second weight, and the third risk is associated with a third weight, and
wherein determining the score for each permutation comprises:
determining a docking segment for each planned vehicle route of the one or more planned vehicle routes of the each permutation;
determining lengths of flight segments in a path including the docking segments for the one or more planned vehicle routes; and
assigning the permutation score to the each permutation according to function that increases with the length of the flight segments;

determining start and end points for the docking segment for each planned vehicle route of the one or more planned vehicle routes of the each permutation according to:
  excluded portions of the each planned vehicle route;
  the risk factors associated with locations along the each planned vehicle route; and
  a distance from locations along the each planned vehicle route to another planned vehicle route of the one or more planned vehicle routes of the each permutation;
selecting a selected permutation of the plurality of permutations according to the permutation scores, the docking segments lying on the one or more planned vehicle routes of the selected permutation, wherein the selected permutation minimizes a flight time of the drone;
defining a drone flight path between the drone origin and the drone destination and including the docking segments of the selected permutation; and
transmitting the drone flight path to the drone, wherein the drone flight path includes a first segment in which the drone flies from the origin to a first vehicle, a second segment in which the drone is docked to the first vehicle, a third segment in which the drone flies from the first vehicle to a second vehicle, a fourth segment in which the drone is docked to the second vehicle, and a fifth segment in which the drone flies from the second vehicle to the destination.

2. The method of claim 1, further comprising:
transmitting the plurality of planned vehicle routes to the plurality of autonomous vehicles; and
traversing, by the plurality of autonomous vehicles, the plurality of planned vehicle routes.

3. The method of claim 1, further comprising:
accessing a plurality of route pairs, each route pair including a vehicle origin and a vehicle destination; and
defining the plurality of routes such that each route of the plurality of routes includes navigation instructions from the vehicle origin and the vehicle destination of the each route.

4. The method of claim 3, further comprising:
defining the plurality of routes such that for at least route pair of the plurality of route pairs, the plurality of routes include two or more routes between the vehicle origin and the vehicle destination of the at least one route pair;
selecting a selected route of the two or more routes in response to selecting a docking segment of the one or more docking segments on the selected route; and
causing a first autonomous vehicle of the plurality of autonomous vehicles to traverse the selected route.

5. The method of claim 1, wherein selecting the one or more docking segments along one or more of the plurality of planned vehicle routes comprises:
for each planned route of the plurality of planned vehicle routes, (a) determining a start point and an end point for the each planned route and (b) calculating a path score for a drone flight path including docking between the start point and the endpoint of the each panned route; and
for each permutation of at least a portion of a plurality of permutations of groups of two or more routes of the plurality of planned vehicle routes, determining a path score for the each permutation using the start point for a first-traversed route of the two or more routes and the end point for the last-traversed route of the two or more routes; and selecting, based on the path scores, one of (c) a planned route of the plurality of planned vehicles with the start and end points for the planned route and (d) a permutation of the plurality of permutations;
wherein the one or more docking segments are one or more portions of the at least one of (c) and (d).

6. The method of claim 1, wherein defining the drone flight path between the drone origin and the drone destination and including the one or more docking segments further comprises adjusting the drone destination according to an end point of a last docking segment of the one or more docking segments.

7. A system comprising one or more processing devices and one or more memory devices operably coupled to the one or more processing devices, the one or more memory devices storing executable code effective to cause the one or more processing devices to:
access a plurality of planned vehicle routes for a plurality of autonomous vehicles;
access a drone origin and a drone destination for a first drone;
for each permutation of at least a portion of a plurality of permutations of the plurality of planned vehicle routes including one or more routes of the plurality of planned vehicle routes, determine a permutation score for the each permutation, wherein the permutation scores are further based on one or more risk factors, and wherein the permutation scores are further based on minimizes a flight time of the drone,
wherein the risk factors comprise at least one of a first risk associated with transferring the drone among the plurality of autonomous vehicles, a second risk associated with the drone not reaching a vehicle of the plurality of autonomous vehicles in time, and a third risk associated with the drone not being secured properly to the vehicle, and
wherein the first risk is associated with a first weight, the second risk is associated with a second weight, and the third risk is associated with a third weight, and
wherein determining the score for each permutation comprises:
  determine a docking segment for each planned vehicle route of the one or more planned vehicle routes of the each permutation;
  determine lengths of flight segments in a path including the docking segments for the one or more planned vehicle routes; and
  assign the permutation score to the each permutation according to function that increases with the length of the flight segments;
determine start and end points for the docking segment for each planned vehicle route of the one or more planned vehicle routes of the each permutation according to:
  excluded portions of the each planned vehicle route;
  the risk factors associated with locations along the each planned vehicle route; and
  a distance from locations along the each planned vehicle route to another planned vehicle route of the one or more planned vehicle routes of the each permutation;
select a selected permutation of the plurality of permutations according to the permutation scores, the docking segments lying on the one or more planned vehicle routes of the selected permutation, wherein the selected permutation minimizes a flight time of the drone;

define a first drone flight path between the drone origin and the drone destination and including a first docking segment of the one or more docking segments of the selected permutation; and transmit the drone flight path to the first drone, wherein the drone flight path includes a first segment in which the first drone flies from the origin to a first vehicle, a second segment in which the first drone is docked to the first vehicle, a third segment in which the first drone flies from the first vehicle to a second vehicle, a fourth segment in which the first drone is docked to the second vehicle, and a fifth segment in which the first drone flies from the second vehicle to the destination.

8. The system of claim 7, further comprising the first drone, the first drone programmed to traverse the third drone flight path from the origin to the destination while docking on one or more vehicles of the plurality of autonomous vehicles when traversing the one or more docking segments.

9. The system of claim 8, further comprising the plurality of autonomous vehicles, the executable code being further effective to cause the one or more processing devices to transmit the plurality of planned vehicle routes to the plurality of autonomous vehicles, the plurality of autonomous vehicles being programmed to autonomously traverse the plurality of planned vehicle routes.

10. The system of claim 8, wherein the executable code is further effective to cause the one or more processing devices to:

access a plurality of route pairs, each route pair including a vehicle origin and a vehicle destination; and define the plurality of routes such that each route of the plurality of routes includes navigation instructions from the vehicle origin and the vehicle destination of the each route.

11. The system of claim 10, wherein the executable code is further effective to cause the one or more processing devices to:

define the plurality of routes such that for at least route pair of the plurality of route pairs, the plurality of routes include two or more routes between the vehicle origin and the vehicle destination of the at least one route pair;

select a selected route of the two or more routes in response to selecting a docking segment of the one or more docking segments on the selected route; and cause a first autonomous vehicle of the one or more autonomous vehicles to traverse the selected route.

12. The system of claim 7, wherein the executable code is further effective to cause the one or more processing devices select the one or more docking segments along one or more of the plurality of planned vehicle routes by:

for each planned route of the plurality of planned vehicle routes, (a) determining a start point and an end point for the each planned route and (b) calculating a path score for a drone flight path including docking between the start point and the endpoint of the each panned route; and for each permutation of at least a portion of a plurality of permutations of groups of two or more routes of the plurality of planned vehicle routes, determining a path score for the each permutation using the start point for a first-traversed route of the two or more routes and the end point for the last-traversed route of the two or more routes; and selecting, based on the path scores, one of (c) a planned route of the plurality of planned vehicles with the start and end points for the planned route and (d) a permutation of the plurality of permutations;

wherein the one or more docking segments are one or more portions of the at least one of (c) and (d).

13. The system of claim 7, wherein the executable code is further effective to cause the one or more processing devices to define the drone flight path between the drone origin and the drone destination and including the one or more docking segments by adjusting the drone destination according to an end point of a last docking segment of the one or more docking segments.

* * * * *